Patented June 8, 1954

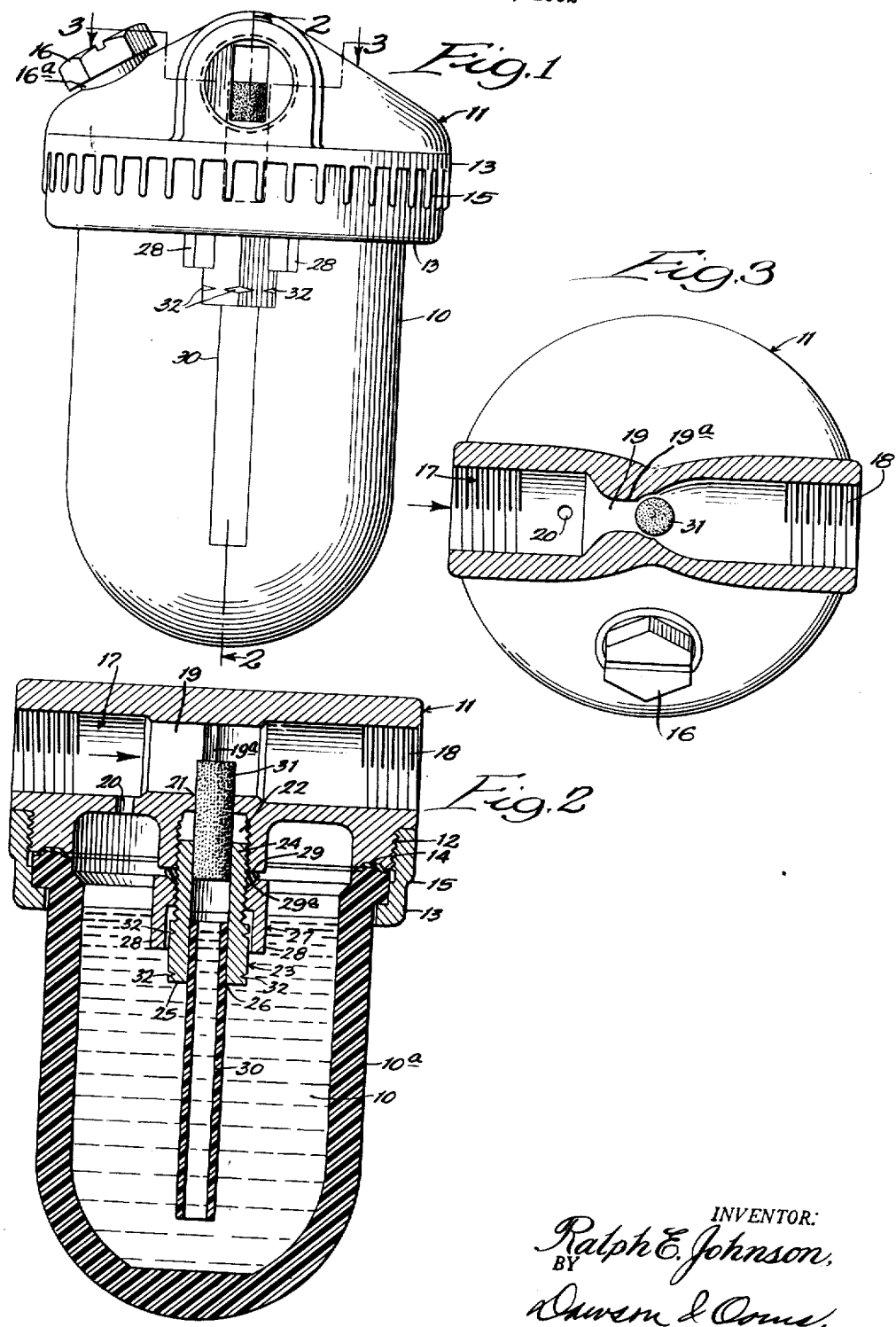

2,680,496

UNITED STATES PATENT OFFICE 2,680,496

AIR LINE LUBRICATOR

Ralph E. Johnson, Wheaton, Ill., assignor to Arrow Tools, Inc., Chicago, Ill., a corporation of Illinois Application February 8, 1952, Serial No. 270,547

13 Claims. (Cl. 184—55)

This invention relates to devices for delivery of fluid into the air supply stream of pneumatic equipment in the form of a fine spray or mist and more particularly to airline lubricators for pneumatic tools or the like. This application forms a continuation-in-part of my co-pending application, Serial No. 251,221 filed October 13, 1951 which has been abandoned.

In lubricating the operating components of pneumatically driven equipment by introducing a fluid lubricant into the air supply stream, it is desirable to have the lubricant enter the air stream as a very fine spray or mist, and to have the quantity of lubricant entering the air stream remain as nearly constant as possible for each mass or volume (assuming a given pressure) of air delivered to the equipment.

In the past, in an attempt to accomplish these purposes, various types of lubricators have been employed. None, however, have been successful in regulating with any degree of accuracy the quantity of lubricant entering the air stream so as to keep the quantity of lubricant per volume of air used nearly constant as the air volume demand of the pneumatic equipment varies. Neither have attempts to introduce lubricant into the air stream as a mist or as fine particles during all periods of operation been altogether successful.

Wick type lubricators have been employed in an effort to accomplish these purposes with some degree of success. In these, a portion of the wick is submerged in the lubricant and the opposite end of the wick extends into the air stream. Thus, capillary action of the wick carries the lubricant from a reservoir into the air stream.

Quantity regulation of the lubricant carried into the air stream is very poor in such lubricators. One reason for this being that as the supply of lubricant in the reservoir decreases, less wick area is submerged, and less lubricant is carried into the air stream. In addition, increasing and decreasing the area of the wick extending into the air stream has not provided satisfactorily control over the quantity of lubricant evaporated into the air stream because the change in pressure resulting from the change in the passage restriction or orifice size (as the wick area extending into the passage is increased or decreased) is not utilized appreciably in forcing more or less lubricant through the wick and into the air stream.

Also, these structures suffer the disadvantage that the capillary action of the wick continues during periods of inoperation of the pneumatic

2 equipment and results in saturation of the wick and the forming of a heavy coating of lubricant on its surface. When the equipment is next placed in operation, lubricant coating the surface of the wick is picked up by the air stream and carried into the equipment in large drops and over-lubrication and improper lubrication results. These lubricators failed then to accomplish the purpose for which they were used.

Air line lubricators operating on pressure differential principles have been used in an effort to obtain control over the amount of lubricant delivered into the air stream. In known lubricators of this type, lubricant is delivered to the air stream only during periods of air flow. However, many of these lubricators cause flooding when the equipment is turned on and off and only crude control over the quantity of lubricant delivered per volume of air flow is attained. Of course, the lubricant delivered is not finely divided and the desirable feature of spray or atomized lubrication is lost.

It is, therefore, an object of my invention to provide an air line lubricator in which the quantity of lubricant delivered into the air stream varies in ratio to variations in the volume of air passing through the air line in which the lubricator is interposed so that the quantity of lubricant dispersed in a given volume of air remains relatively constant for any one feeder setting regardless of the volume of air used by the equipment.

A further object of my invention is to provide a means to accomplish the aforesaid object automatically as an integral feature of my lubricator.

Another object of my invention is to provide a lubricator in which a lubricant feeder of porous material is used to feed or disperse a lubricant into the air supply stream of pneumatic equipment in the form of finely divided particles, and in which the porous lubricant feeder is automatically placed out of contact with the lubricant in the lubricator reservoir when the equipment is not in operation, thereby preventing the lubricant feeder from becoming saturated due to a continuation of the capillary action of the material. Delivery of lubricant into the air stream as globules or large drops when the equipment is next placed in operation is thereby prevented.

Yet another object of my invention is to provide a lubricator in which the lower surface of the lubricant feeder is subjected to a vacuum caused by the falling of the lubricant in the lubricant supply tube when the flow of air in the air supply line is terminated and the pressure on the lubricant in the reservoir decreases.

A further object is to provide a lubricator in which sudden flooding of the air stream with lubricant is eliminated.

A still further object of this invention is to provide an air-line lubricator in which the passage through which air is delivered has a restricted intermediate portion formed by the inward projections of the side walls of the passage to a point almost contacting the lubricant feeder extending into the passage so that the flow of air is over from the top of the feeder and delivery of lubricant into the air stream is primarily a function of the pressure difference between the upstream and restricted portion of the passage.

A still further object of this invention is to provide a positive orifice, the size of which may be positively adjusted, through which the air must be positively adjusted, through which the air must flow, thereby giving accurate and positive control of the pressure differential across the orifice with the result that the quantity of lubricant evaporated into the air stream may be accurately adjusted.

Still a further object is to provide a positive orifice in which the size of the orifice is determined by the axial position of the lubricant feeder in the air passage. The term positive orifice is used to mean an orifice of variable size in which the size of the opening is positively or accurately adjustable to provide an orifice of required size.

Additional objects and advantages of this invention will appear as the specification proceeds.

My invention can best be understood by reference to the drawings in which—

Figure 1 is an end view in elevation of the lubricator comprising my invention;

Figure 2 is a vertical sectional view taken on the line 2—2 of Figure 1 showing the lubricant out of contact with the feeder means during periods of inoperation; and Figure 3 is a top sectional view taken on the line of 3—3 of Figure 1.

In the illustration given, a reservoir 10 is provided in a container or bowl 10a supported on a housing or cap 11, having a threaded portion 12, by a fitting or nut 13. A sealing gasket 14 is interposed between the reservoir 10 and the housing 11. The fitting 13 has knurls 15 so that it may be easily gripped for tightening. A filler plug 16 is provided in the upper portion of the housing 11 for introduction of a lubricant into the reservoir. A sealing gasket or O-ring 16a is positioned between the housing 11 and the filler plug 16. The reservoir 10 may be of any general shape and formed from any desired material. In the preferred embodiment of my invention I use a transparent plastic which is not easily broken and through which the contents of the reservoir and the positioning of the lubricant feeder (to be described later) are easily visible.

The housing 11 has a passage 17 running longitudinally therethrough in which threaded portions 18 are provided at each end so that the housing may be interposed and fastened in the air delivery line of pneumatic equipment with which the lubricator is used. A small transverse passage or aperture 20 opens into the bottom of the high pressure side or upstream side of the longitudinal passage 17 and communicates with the reservoir 10.

The cross-sectional area of the passage 17 is decreased at the central portion to form a restricted section 19 in the passage as shown more clearly in Figure 3. Restricting the passage 17 at some intermediate point, the central portion in the illustration, and introducing the lubricant feeder into the passage at the restricted area results in a greater pressure differential between the point at which the feeder enters the passage and that portion of the passage lying upstream of the feeder. The pressure differential results from the difference of the velocity of flow of the air stream through the enlarged and restricted portions of the passage. The velocity is greater through the restricted portion and a lower pressure accompanies the increase in the velocity.

In the preferred embodiment of my invention, the restriction comprises an orifice, the size of which may be positively varied and controlled. The orifice (Fig. 1) is generally rectangular in shape and is formed by the inwardly extending projections 19a of the passage side walls and the lubricant feeder. The width of the passage between the projections 19a is somewhat less than the diameter or width of the lubricant feeder. As seen in Figure 3, the lubricant feeder extends into the passage 17 adjacent the restricted portion 19 and on the down stream side thereof. Therefore, the air flowing through the passage must pass over the top portion of the feeder and it is seen that the size of the orifice provided by the projections 19a and the feeder is adjusted by changing the axial position of the feeder within the passage. It has been found that this arrangement is particularly successful in controlling or regulating the quantity of lubricant evaporated into the air stream. Since the size of the orifice may be positively determined, the velocity of flow of the air through the restricted portion 19 of the passage and through the orifice may be accurately regulated. This results in an accurate regulation of the pressure differential existing between the upstream portion of the passage and the restricted portion of the passage or point at which the lubricant feeder enters the passage.

This arrangement is also successful in causing the lubricant to enter the air stream in the form of extremely fine particles or as a very fine mist. This permits the lubricant to be ideally dispersed throughout the air stream. However, it is to be understood that the passage 17 could be of constant diameter throughout; the lubricant feeder extending into the passage 17 providing a sufficient restriction to create a pressure differential between different portions of passage 17 to produce satisfactory results. Also, the size of the restriction 19 could be some value between the constant diameter passage and that shown in Figure 3.

A bore 21 having an enlarged, threaded portion 22 is provided through the lower central part of the housing 11 and extends between the restriction 19 of the passage 17 and the reservoir 10. In the preferred embodiment, the bore 21 is adjacent the restriction 19 at the down stream side thereof. A bolt 23 having a threaded end 24, a head 25, and a bore 26 extending longitudinally therethrough is adapted to enter the threaded portion 22 of the bore 21 and to be adjusted axially therein. A lock nut 27 having side extensions 28 adapted to receive the head 25 of the bolt 23 screws onto the threaded end 24 of the bolt 23 and may be tightened against the housing 11 to lock the bolt 23 in axial adjustment. A sealing gasket 29 is interposed between the locking nut 27 and the housing 11. The lock nut 27 has a chamfered portion 29a into which the gasket 29 is squeezed upon tightening of the lock nut 27 against the housing 11, thereby providing a tighter seal.

A hollow tube 30 is adapted to be inserted into the bore 26 of the bolt 23 at the head end, and to be secured in place by adhesive or any other suitable means. The tube 30 must be of sufficient length to extend into the fluid contained in the reservoir 10; leaving a clearance from the bottom of the reservoir to permit axial adjustment of the bolt 23. The tube 30 may be made of any desired material, but I prefer to use a transparent plastic so that it is easily seen, through the transparent reservoir, when fluid is in the tube.

A lubricant feeder 31 is adapted to be inserted into the bore 26 of the bolt 23 at the threaded end and is secured in position by any suitable means such as an adhesive or a press fit. The lubricant feeder need not extend into contact with the tube 30 and should not extend directly into the fluid in the reservoir, that is, to the fluid level in the reservoir. The length of the feeder 31 should be such that it extends substantially to the top of the passage 17 when the bolt 23 is adjusted axially to the most advanced position. In the preferred embodiment of my invention I use a lubricant feeder made from porous or powdered bronze. However, feeders made from many porous materials are suitable. For example, feeders of other porous metals, such as powdered iron, may readily be used; porous, non-metallic substances are suitable; the only requirement is that fluid can be transferred through the feeder.

The head 25 of the bolt 23 has spaced-apart markings 32 at each corner. These markings are employed in conjunction with the side extensions 28 of the lock nut 27 and therewith form an indicator, the use of which permits the length of the feeder 31 extending into the passage 17 to be easily ascertained. When the lower markings 32 are in line with the lower edge of the side extensions 28, the feeder 31 is extended into the restriction 19 to its most advanced position. If the upper markings 32 are in line with the lower edge of the side extensions 28, the feeder 31 is retracted to its most withdrawn position. The open areas between the side extensions 28 permit viewing of the upper markings 32 in all positions of axial adjustment of the bolt 23. Thus, any length of the feeder 31 extending into the restriction 19 is easily determined by comparing the position of the lower edge of the side extensions 28 as related to the upper and lower markings 32.

Since the head 25 of the bolt 23 is received within the side extensions 28 of the locking nut 27, the open areas between the side extensions 28 permit a wrench to engage both the head 25 and the locking nut 27 simultaneously. Thus, once the desired axial adjustment of the bolt 23 relative to the lower edge of side extension 28 is set, the two are turned together until the locking nut is tightened securely against the housing 11. Therefore, there is no chance of the adjustment being altered during the locking operation. In addition, since the locking nut may be securely tightened, the adjustment is not readily loosened by the vibration of the equipment.

In operation, the housing 11 is fastened in the air delivery line of some pneumatic equipment such as an air compressor, the feeder 31 is adjusted to the desired position by setting the axial adjustment of the bolt 23, and fluid is poured into the reservoir 10 through the filler plug 16 until the lower portion of the tube 30 is submerged.

When air under pressure is placed in the air delivery line of the equipment with which the lubricator is used, oil immediately rises in the tube 30 since the pressure in the tube 30 cannot increase as rapidly as that in the reservoir because of the resistance the porous feeder 31 offers to the flow of air downwardly through it and into the reservoir. The aperture 20 readily permits pressure to build up in the reservoir 10. Air initially in the tube 30 is compressed until it reaches the pressure in the air line and a condition of equilibrium is reached.

As air flows in the air delivery line, the rectriction 19 implemented by the resistance to the flow of air caused by the extension of the feeder 31 into the restriction 19 creates a pressure differential between the point at which the aperture 20 opens into the passage 17 and the restricted area of the passage. The pressure of the reservoir 10 will be that existing in the passage 17 at the point of the aperture 20. The restricted portion of passage 17 is, of course, the low pressure point of the passage. Thus, air in the tube 30 will be expelled through the feeder 31 and fluid will rise in the tube 30 and into contact with the feeder 31 where it is carried into the restriction 19 by both the capillary action of the porous feeder 31 and the pressure of the fluid in the tube 30 pushing upwards against the porous feeder 31. Because of the fine porosity of the feeder 31, the lubricant is broken down into finely divided particles. It is picked up by the air stream in this finely divided state and carried into the pneumatic equipment in the form of a fine spray or mist.

When the air flow is subsequently stopped, the pressure in the reservoir immediately decreases and the fluid in the tube 30 immediately drops below the level of the bottom of the feeder 31. If the feeder 31 is sealed to the sides of the bore 21, a partial vacuum is created in the tube 30 since the pressure in the tube cannot be immediately equalized because of the resistance offered by the fluid filled pores of the feeder 31 to the flow of air from the passage 17. Thus, the vacuum created causes the feeder 31 to be drained and a coating of lubricant will not form on the surface of the feeder 31 during periods of inoperation.

Due to the construction of the lubricator, the amount of fluid delivered into the air stream automatically varies as the mass or volume of air passing the feeder 31 varies. As the volume of air increases, the quantity of lubricant increases and vice versa. The reasons for this are at least threefold. First, a greater volume of air passing feeder 31 will result in an increase in the quantity of lubricant evaporated into the air stream. Secondly, the increased volume will necessitate an increase in the velocity of the air passing through the restriction in the passage 17. An increase in the mass velocity of a fluid such as air passing a liquid film, as a lubricating oil, is accompanied by an increase in the amount of the liquid evaporated into the mass of fluid. Where the flow of the fluid is perpendicular to the film of liquid, an increase in mass velocity results in a large increase in the amount of evaporation, but where the flow of fluid is parallel to the liquid film, an increase in mass velocity causes only a very small increase in the amount of evaporation. Thirdly, the increased velocity of the air passing through the restriction 19 will cause a greater pressure differential to exist between the point at which the feeder 31 enters passage 17 and the point at which the aperture 20 is located. This increase in pressure differential will be reflected as a like increase of the pressure in the reservoir 10. A greater pressure will therefore be exerted by the lubricant in the tube 30 against and into the porous feeder 31, thereby causing a greater quantity of fluid to be delivered into the air stream. Thus, by utilizing the resulting change in pressure differential caused by a change in air volume delivered through passage 17, the quantity of lubricant introduced into the air stream is caused to remain nearly constant per volume of air used.

In the preferred embodiment of my invention which utilizes the positive orifice, the quantity of lubricant evaporated from the feeder 31 will be primarily a reflection of the pressure differential existing in the passage 17. Lubricant will be evaporated into the air stream from the top of the feeder and will also enter the air stream from the downstream surface of the feeder because of the lower pressure at that point. However, since the airstream passes parallel to the top of the feeder 31 and does not impinge directly upon the downstream portion of the feeder, an increase in the mass velocity of flow increases the rate of evaporation per given mass or volume of air only a small amount. Therefore, quantity regulation is very accurately controlled because the amount of lubricant reaching the evaporation surface of the feeder 31 depends almost wholly upon the pressure urging the lubricant through the pores of the feeder. As previously stated, the pressure differential in the passage is related to the difference in air velocity through the passage and orifice. The velocity of flow through the orifice increases as the orifice size decreases and the pressure at the orifice (and feeder) decreases with the increase in velocity. Thus, raising the feeder decreases the orifice size which in turn creates a greater pressure differential with the result that more lubricant is forced through the feeder and dispersed into the air stream. Accurate regulation is thereby obtained since the external factors usually influencing the amount of lubricant dispensed into the air stream have been eliminated.

The quantity of lubricant delivered for any one setting of the feeder adjustment may be varied by using lighter or heavier lubricant, and also by using feeders having greater or lesser porosity.

With a given feeder, lubricant viscosity, and air volume, the quantity of lubricant delivered into the air stream may be varied by simply changing the length of the feeder 31 extending into the passage 17. This is easily accomplished by simply changing the axial adjustment of the bolt 23. Thus, as the size of the equipment, work conditions, or type of work being done is changed, the quantity of lubricant supplied to the air stream is easily regulated to correspond to the demand.

Providing the feeder adjusting means within the reservoir prohibits accidental changing of the setting. Yet, the position of the setting is easily determined by viewing it through the transparent wall of the reservoir 10. The reservoir 10 is easily detached from the housing 11 making the bolt 23 readily available if it is desired to change the feeder setting.

In the preferred embodiment of my invention, I use a transparent reservoir 10 and a transparent tube 30. It is, therefore, possible to determine whether the lubricator is functioning properly by simply looking through the transparent side wall and into the reservoir 10 to see whether the fluid has been forced upward in the transparent tube 30. If fluid is not in the tube 30 and the equipment is in operation, the lubricator is not functioning. Since air line lubricators are prone to improper operation from such things as air leaks resulting from insufficient tightening of the various fittings, this is a desirable advantage.

In the lubricator of my invention, the only surface of the feeder 31 in contact with reservoir lubricant is the bottom or lower end surface thereof and this contact occurs only when the lubricator is in operation. Thus, the quantity of lubricant evaporated into the air stream is independent of the level of lubricant within the reservoir with the result that greater accuracy and control over the amount of lubricant entering the air stream is obtained.

While, in the foregoing specification, I have set forth a specific structure in considerable detail for the purpose of illustrating one embodiment of the invention, it will be understood that such details of structure and means may be varied widely by those skilled in the art without departing from the spirit of my invention.

I claim:

1. An air line lubricator, comprising a container providing a reservoir for lubricating fluid, a housing secured to said container, said housing providing a passage for the flow of air therethrough, a bore in communication between said passage and said reservoir, feeder means mounted within said bore and extending into said passage and the lower portion of said feeder means terminating above the level of the lubricating fluid, a tube extending downwardly into said reservoir so that the lower end thereof is immersed within the lubricating fluid in said reservoir, and means connecting the upper end of said tube with the lower end of said feeder means, said housing also providing an aperture in open communication between said passage and said reservoir, said passage having a restricted portion adjacent said bore and feeder to provide an opening of slightly smaller cross section than the width of said feeder.

2. An air line lubricator, comprising a container providing a reservoir for lubricating fluid, a housing secured to said container, said housing providing a passage for the flow of air therethrough, a bore in communication between an intermediate point in said passage and said reservoir, feeder means adapted to have a lubricant pass therethrough mounted within said bore and extending into said passage and the lower portion of said feeder means terminating above the level of the lubricating fluid, a tube extending downwardly into said reservoir so that the lower end thereof is immersed within the lubricating fluid in said reservoir, means connecting the upper end of said tube with the lower end of said feeder means, said housing also providing an aperture in open communication between said passage and said reservoir, the side walls of said passage having restrictions adjacent said bore and feeder to form an opening of slightly smaller cross section than the width of said feeder to provide with said feeder an orifice through which the air must flow.

3. An air line lubricator comprising a container providing a reservoir for lubricating fluid, a housing secured to said container, said housing providing a passage for the flow of air therethrough, a bore in communication between an intermediate point in said passage and said reservoir, feeder means adapted to having lubricant pass therethrough mounted for axial adjustment within said bore so that the extent of feeder entry into said passage may be adjusted, a tube extending downwardly into said reservoir so that the lower end thereof is immersed within the lubricating fluid in said reservoir, and means connecting the upper end of said tube with the lower end of said feeder means, said housing also providing an aperture in open communication between said passage and said reservoir, the side walls of said passage being turned inwardly adjacent said bore and feeder to form two substantially parallel edges spaced apart by a distance slightly smaller than the width of said feeder, said feeder forming a closure between said parallel edges to provide with said edges an orifice, the size of which depends upon the axial position of the feeder within said passage.

4. An air line lubricator, comprising a container providing a reservoir for lubricating fluid, a housing secured to said container, said housing providing a passage for the flow of air therethrough, a bore in communication between the mid-section of said passage and said reservoir, feeder means of a porous material mounted for axial adjustment within said bore so that the extent of feeder entry in said passage may be adjusted, a tube extending downwardly into said reservoir so that the lower end thereof is immersed within the lubricating fluid in said reservoir and means connecting the upper end of said tube with the lower end of said feeder means so that lubricating fluid can ascend said tube and pass into said feeder means, said housing also providing an aperture in open communication between a point in the up stream portion of said passage and said reservoir, the walls of said passage extending inwardly adjacent said bore and feeder on the up stream side thereof to form a substantially rectangular orifice of slightly smaller cross section than the width of said feeder, the upper surface of said feeder forming the bottom edge of said orifice so that the size of said orifice is determined by the axial position of said feeder within said passage.

5. An air line lubricator comprising a container providing a reservoir for lubricating fluid, a housing secured to said container, said housing providing a longitudinally extending passage for the flow of air therethrough, a bore in communication between an intermediate point in said passage and said reservoir, a feeder of porous material adapted to have lubricant pass therethrough adjustably mounted within said bore so that the extent of feeder entry into said passage may be adjusted, a tube extending downwardly into said reservoir so that the lower end thereof is immersed within the lubricating fluid in said reservoir, and means adapted to have a lubricant flow therethrough connecting the upper end of said tube with the lower end of said feeder, said housing also providing an aperture in open communication between a point in said passage up stream of said bore and said reservoir, the walls of said passage extending inwardly adjacent said bore and feeder on the up stream side thereof to form a substantially rectangular orifice of slightly smaller cross section than the width of said feeder, the side walls of said orifice being substantially parallel with the longitudinal axis of said feeder and positioned so that the central longitudinal axis of said feeder is midway between the orifice side walls, whereby the size of said orifice is determined by the axial position of said feeder within said passage with the result that the velocity of flow of the air stream through said orifice may be accurately determined by the adjustment of said feeder, and the pressure differential between said aperture and said orifice which is a reflection of the difference in velocity of the air stream in the up stream portion of said passage and through said orifice may be accurately controlled permitting accurate control of the quantity of lubricant passing through said feeder and into said air stream.

6. A lubricator adapted to be interposed in an air line to supply lubricant to the air passing therethrough, comprising a container providing a reservoir for lubricating fluid, a housing secured to said container, said housing providing a passage for the flow of air therethrough when said lubricator is interposed in said air line, and a bore connecting an intermediate point in said passage with said reservoir, feeder means mounted in said bore, said feeder means being a porous material, the upper portion of said feeder means extending into said passage and the lower portion of said feeder means terminating above the level of the lubricating fluid, a tube extending downwardly into said reservoir so that the lower end thereof can be immersed within the lubricating fluid in said reservoir, means connecting the upper end of said tube with the lower end of said feeder means so that said lubricating fluid can ascend said tube and pass into said feeder means, said housing also providing an aperture in open communication between said passage and said reservoir, whereby when a stream of air is forced through said passage, the pressure within said passage is transferred through said aperture to the surface of said lubricating fluid, while at the same time the transfer of said pressure to the inside of said tube is limited by said feeder means with the result that said lubricating fluid rises in said tube until it contacts said feeder means and passes therethrough to its exposed outer surface where it is picked up by said air stream, and thereafter, when the flow of air in said passage is terminated, the lubricating fluid in said tube recedes out of contact with said feeder means.

7. The structure of claim 6 in which said feeder means is mounted in said bore in sealing relationship therewith, whereby air cannot enter into said tube from between said feeder means and said bore, and when the flow of air in the said passage is terminated, the lubricating fluid remaining in said feeder means is sucked back into said tube by the falling of the fluid within said tube.

8. A lubricator adapted to be interposed in an air line to supply lubricant to the air passing therethrough, comprising a container providing a reservoir for lubricating fluid, a housing secured to said container, said housing providing a passage for the flow of air therethrough when said lubricator is interposed in said air line, said passage having a restricted intermediate portion therein so that a pressure differential exists between the upstream and downstream portion of said passage when air is flowing therethrough, and a bore connecting a point on the downstream portion of said passage with said reservoir, feeder means mounted in said bore, said feeder means being a porous material, the upper portion of said feeder means extending into said passage and the lower portion of said feeder means terminating above the level of the lubricating fluid, a tube extending downwardly into said reservoir so that the lower end thereof can be immersed within the lubricating fluid in said reservoir, means connecting the upper end of said tube with the lower end of said feeder means so that said lubricating fluid can ascend said tube and pass into said feeder means, said housing also providing an aperture in open communication between a point in the upstream portion of said passage and said reservoir, whereby when a stream of air is forced through said passage, the pressure within said passage is transferred through said aperture to the surface of said lubricating fluid, while at the same time the transfer of said pressure to the inside of said tube is limited by said feeder means with the result that said lubricating fluid rises in said tube until it contacts said feeder means and passes therethrough to its exposed outer surface where it is picked up by said air stream, and thereafter, when the flow of air in said passage is terminated, the lubricating fluid in said tube recedes out of contact with said feeder means.

9. The structure of claim 8 in which said feeder means is mounted in said bore in sealing relationship therewith, whereby air cannot enter into said tube from between the said feeder means and said bore, and when the flow of air in said passage is terminated, the lubricating fluid remaining in said feeder means is sucked back into said tube by the falling of the fluid within said tube.

10. The structure of claim 9 in which said bore connects a point in said restricted portion of said passage with said reservoir, and in which said aperture is positioned adjacent said restricted portion of said passage on the upstream side thereof.

11. The structure of claim 9 in which said container providing a reservoir therein is detachable from said housing, and in which means are provided from within said container to adjust the length of said feeder means extending into said passage.

12. The structure of claim 9 in which said feeder means is a porous metal.

13. The structure of claim 9 in which said feeder means is a sintered material.

References Cited in the file of this patent

UNITED STATES PATENTS

| Number | Name | Date |
|---|---|---|
| 1,990,524 | Bystricky | Feb. 12, 1935 |
| 2,229,176 | Kehle | Jan. 21, 1941 |
| 2,515,417 | Myers | July 18, 1950 |